United States Patent [19]

Schwarz et al.

[11] Patent Number: 5,614,460
[45] Date of Patent: Mar. 25, 1997

[54] MICROPOROUS CARBONS FOR FUEL GAS STORAGE

[75] Inventors: James A. Schwarz, Fayetteville; Karol Putyera, Syracuse; Teresa J. Bandosz, Syracuse; Jacek Jagiello, Syracuse, all of N.Y.

[73] Assignee: Syracuse University, Syracuse, N.Y.

[21] Appl. No.: 518,553

[22] Filed: Aug. 23, 1995

[51] Int. Cl.$^6$ .................................................. B01J 20/02
[52] U.S. Cl. .......................... 502/418; 502/416; 502/420; 502/180
[58] Field of Search .................................. 502/180, 416, 502/418, 420

[56]  References Cited

U.S. PATENT DOCUMENTS

| 4,040,990 | 8/1977 | Neely | 260/2.1 R |
| 4,205,055 | 5/1980 | Maire et al. | 423/445 |
| 4,261,709 | 4/1981 | Itoga et al. | 55/79 |
| 4,263,268 | 4/1981 | Knox et al. | 423/449 |
| 4,471,072 | 9/1984 | Leyerle et al. | 502/413 |
| 4,526,887 | 7/1985 | Sutt, Jr. | 502/420 |
| 4,540,678 | 9/1985 | Sutt, Jr. | 502/5 |
| 4,594,163 | 6/1986 | Sutt, Jr. | 210/660 |
| 4,716,736 | 1/1988 | Schwarz | 62/48 |
| 4,775,655 | 10/1988 | Edwards et al. | 502/416 |
| 4,832,881 | 5/1989 | Arnold, Jr. et al. | 264/29.7 |
| 4,839,331 | 6/1989 | Maroldo et al. | 502/416 |
| 4,902,312 | 2/1990 | Chang | 55/71 |
| 5,071,450 | 12/1991 | Cabrera et al. | 55/66 |
| 5,086,033 | 2/1992 | Armor et al. | 502/432 |
| 5,098,880 | 3/1992 | Gaffney et al. | 502/432 |
| 5,208,003 | 5/1993 | Simandl et al. | 423/445 |
| 5,232,772 | 8/1993 | Kong | 428/312.2 |
| 5,298,313 | 3/1994 | Noland | 428/229 |
| 5,300,272 | 4/1994 | Simandl et al. | 423/445 R |
| 5,385,876 | 1/1995 | Schwarz et al. | 502/80 |

OTHER PUBLICATIONS

Roger Cracknell et al., Influence of Pore Geometry on the Design, etc., Aug. 25, 1992.

*Primary Examiner*—Glenn A. Caldarola
*Assistant Examiner*—In Suk Bullock
*Attorney, Agent, or Firm*—Harris Beach & Wilcox, LLP

[57]  ABSTRACT

A method of making a microporous carbon material which includes providing a precursor selected from the group consisting of crystalline salts of aromatic sulfonates and nonporous polymeric salts. Heat treatment of such precursors in the temperature range of 350° to 850° C. in an inert oxygen free atmosphere for a sufficient time promotes thermally induced hydrogen abstraction and rearrangement of BSUs which result in the formation of a carbonaceous microporous material having a pore size distribution in the range of about 4–15 Å. The structural and storage characteristics of the microporous carbon materials are also disclosed.

11 Claims, 6 Drawing Sheets

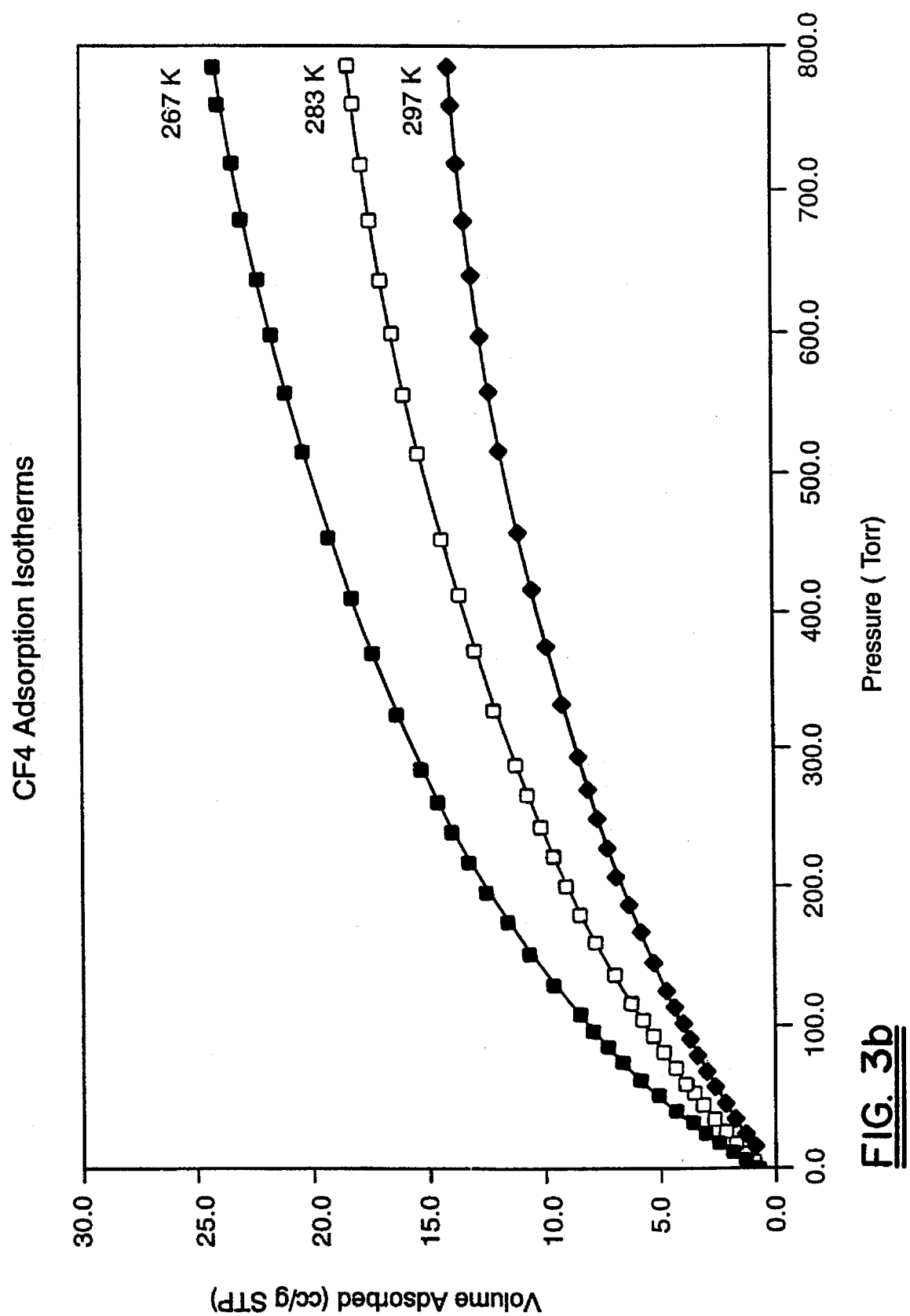

MICROPOROUS CARBONS FOR FUEL GAS STORAGE

BACKGROUND OF THE INVENTION

The present invention relates in general to activated carbon materials, and more specifically to carbon adsorbents suitable for use as storage media for light fuel gases.

Porous carbons and carbon molecular sieving materials are widely used in adsorption applications which include gas separations and other chemical applications based on physical adsorption. The following U.S. patents are typical of the prior art and teach a wide variety of materials and processes relating to the current applications for activated carbons:

U.S. Pat. No. 4,205,055 —Maire et al.
U.S. Pat. No. 4,261,709 —Itoga et al.
U.S. Pat. No. 4,263,268 —Knox et al.
U.S. Pat. No. 4,526,887 —Sutt, Jr.
U.S. Pat. No. 4,540,678 —Sutt, Jr.
U.S. Pat. No. 4,594,163 —Sutt, Jr.
U.S. Pat. No. 4,775,655 —Edwards et al.
U.S. Pat. No. 4,832,881 —Arnold, Jr. et al.
U.S. Pat. No. 4,902,312 —Chang
U.S. Pat. No. 5,071,450 —Cabrera et al.
U.S. Pat. No. 5,086,033 —Armor et al.
U.S. Pat. No. 5,098,880 —Gaffney et al.
U.S. Pat. No. 5,208,003 —Simandl et al.
U.S. Pat. No. 5,232,772 —Kong
U.S. Pat. No. 5,298,313 —Noland
U.S. Pat. No. 5,300,272 —Simandl et al.

Although the above prior art teaches porous carbons for a wide variety of usage, the above patents do not teach the use of these materials as a storage medium for light fuel gases at the supercritical conditions required for such applications. Furthermore, the above prior art requires that the activated carbon be formed by multiple process steps which are both time consuming and costly, and do not provide for a carefully controlled pore size range which is a requirement for optimal gas storage.

U.S. Pat. Nos. 4,839,331 and 4,040,990 are directed to the formation of carbonaceous adsorbents from pyrolized polysulfonated polymers, but do not teach or suggest the use of these materials for gas storage. The '331 and '990 patents include the use of starting materials which are macroporous, and require multiple steps in order to achieve the activated carbon product. Furthermore, the patents teach the formation of activated carbons having a multimodal pore size distribution with a pore sizes ranging between 50–10,000 Å. Activated carbons having pore sizes with such a wide size distribution would not be suitable for use as gas storage materials.

U.S. Pat. Nos. 4,716,736 and 5,385,876 to Schwarz et al. teach the use of activated carbon materials suitable for use as an adsorbent for light gases such as hydrogen and methane. These patents however require methods of preparation in which the activated carbon is formed by multiple process steps.

In addition, an article entitled *Influence of Pore Geometry on the Design of Microporous Materials for Methane Storage*, by R. Cracknell, P. Gordon and K. E. Gubbins, which appears in J. Phys. Chem., 1993, 97, 494–499 addresses the advantage of storing methane by adsorption in microporous materials, and the merits of currently available zeolites and porous carbons. The article is theoretical in nature, and concludes that the prior art fails to teach or provide the technology to economically store methane, and that considering the state of the art, that it would be more economical to store methane as a bulk fluid.

The article observes that key factors which are important in the design of a suitable microporous material are first that the microporous material be such that the amount adsorbed minus the amount retained, when the methane is released, should be a maximum. Second, that the microporosity (fraction of the micropore volume) should be a maximum; that is the space taken by the atoms of the microporous material and the space wasted by poor packing of the crystallites should both be minimized. The authors found that adsorption in a porous material offers the possibility of storing methane at high density while maintaining moderate physical conditions for the bulk phase, and that the search for a suitable material is currently an active area of research.

It can therefore be seen front above that there is a continuing search for suitable light fuel gas storage materials, and that a key objective in developing such a material is the formation of a geometry that provides for optimum pore size distribution that maximizes the excess adsorption, i.e. the density in the pore minus the bulk density, for a given temperature and pressure. The key objective in developing such a material, is to provide a geometry which will provide the maximum storage which is recoverable for use.

SUMMARY OF THE INVENTION

The present invention is directed to microporous carbon adsorbent materials suitable for use as storage media for light fuel gases having a uniform pore size distribution in the range of about 4 to 15 Å, and a high surface area in which the micropores comprise the major proportion of the surface area. The precursor for the preparation of these microporous carbons are crystalline salts of aromatic sulfonates or nonporous polymeric salts with highly organized structure. The micropores are created during heat treatment or pyrolysis within a critical temperature range.

In one embodiment, microporous carbons with a pore structure tailored for adsorption of methane molecules at ambient temperatures and with sufficient bulk densities are prepared by temperature controlled heat treatment of a poly(sodium-4-styrenesulfonate) precursor. The precursor has a M.W. of 70,000 and is in a crystalline powder form. The precursor is carbonized in an oxygen free inert atmosphere such as nitrogen at temperatures in the range of about 45° to 850° C. The carbonized samples are then water extracted until the pH of the extract is in the acid range. By carefully selecting the heating rate, the final heat treatment temperature and time at temperature, the micropore size distribution and bulk densities of the resulting products can be controlled and modified. For example, higher heat treatment temperatures can produce microporous carbon with higher bulk density (~0.8 g/cm$^3$), and also higher methane adsorption capacity at higher pressures (~150 V/V at 50 atm.). The most favorable adsorbent for methane at lower pressures and higher temperatures is prepared at the lower end of the heat treatment temperature range.

For an adsorbent for methane storage in the following working conditions: charging up to 50 arm, discharging down to ~1 arm with a working temperature between 20° and 35° C., carbonization at about 800° C. is recommended.

Porous carbons formed by the method of the present invention can be prepared with uniform pore size distribution and high surface area, and with a uniform surface structure containing few if any mesopores or macropores. The change in heat treatment or pyrolysis conditions may introduce some level of heterogeneity in the pore sizes and surface functionalities, but the average size of the majority of pores remain around 10 Å. These materials are therefore particularly suitable for use as storage media for light fuel gases such as methane or hydrogen, or as catalyst supports.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which.

DETAILED DESCRIPTION OF THE INVENTION

As will become apparent to those versed in the art of solid state chemistry, all of the following criteria are important in selecting the precursors for use in making the activated carbons of the present invention.

We have found that microporous carbons with controlled pore size distributions in the range of 4 to 15 Å and with high bulk density as materials suitable for storage of light gases can be prepared from crystalline salts of aromatic sulfonates, in particular, naphthalene sulfonates and disulfonates, anthraquinone sulfonates and polystyrene sulfonates. These precursors are characterized with high thermal stability and melting points higher than 300° C. Heat treatment of such compounds at sufficiently high temperatures and in the absence of oxygen can promote thermally induced hydrogen abstraction and formation of macrocyclic structural units in the solid phase before melting. Thus, for these precursors the well-known phenomenon of "aromatic growth" can be assumed to occur in the solid state. For instance, SEM results of a CNDS, a carbon derived from naphthalene disulfonates (NDS), clearly confirm that carbonization of this compound occurs predominantly from the solid state. However, it cannot be excluded that carbonization from the vapor phase may also have taken place to a minor extent.

Solid state carbonization together with the presence of alkali metal cations and the released sulfur containing intermediates, which also form melted phases during carbonization are factors controlling the size and thickness of the formed basic structural units (BSUs). Carbonaceous materials obtained from NDS for instance consist of black plate-like crystallites having a residual hydrogen content <1 wt %. High resolution TEM clearly reveals that both high temperature and low temperature materials obtained from this precursor are composed from BSUs with sizes about 10 Å, and composed from two or three graphite-like layers. Small-angle X-ray scattering (SAXS) results also demonstrate that the basic structural units in these samples have graphitic structure but show that there is considerable distortion of lattice planes due to micropores.

The carbonization process and the microstructural characteristics of the carbonaceous materials obtained by the present invention have been studied by Differential Thermal Analysis (DTA), and analyses of nitrogen, methane, $CF_4$, and $SF_6$ adsorption isotherms by conventional procedures well known to the art.

Figure 1:
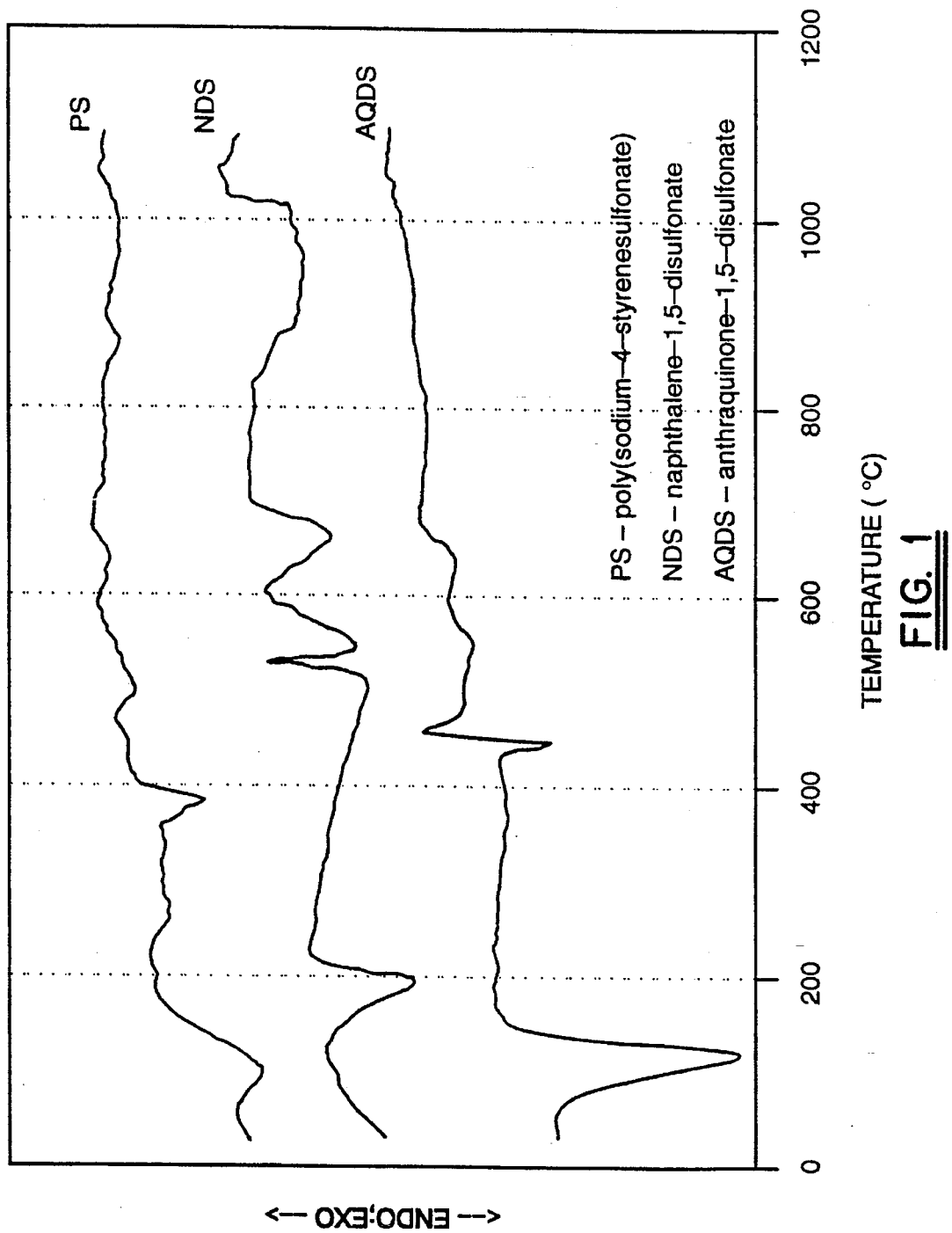
FIG. 1 are Differential Thermal Analysis thermograms of three precursors selected for use in the present invention.

Thermograms from Differential Thermal Analysis of three selected precursors are presented in FIG. 1. These results show that the formation of carbonaceous material from these precursors takes place in a relatively narrow temperature range characterized with simultaneous exothermic and endothermic transformation. These transformations are related to decomposition, aromatic growth and structural rearrangement occurring within a close temperature regime. This fact suggests that the heating rate has significant influence on the microstructure of the formed carbonaceous material. High temperature endotherms are related to additional rearrangement within the formed carbon framework, thus suggesting temperature ranges where different microtextures may form.

All sorption isotherms in the low pressure range were carried out on a GEMINI 2370 Sorption Analyzer (Micromeritics). Before each experiment, the samples were heated for 10 hours at 200° C., and then outgassed at this temperature under a vacuum of $10^5$ atmospheres. Sorption of nitrogen was measured at $-196°$ C., and the data obtained were used to evaluate specific surface areas $S_{N2}$, total pore volumes and micropore volumes (Vmic) using the Dubinin-Radushkewich equation. Evaluation of the surface area which comprises the micropore as a percentage of the total surface area of the material is described in the article *Micropore Structure Development in Poly(Sodium-4-Styrenesulfonate) Derived Carbons*, by K. Putyera, J. Jagiello, T. J. Bandosz, and J. A. Schwarz, which appears in Carbon, 1995, Vol. 33 No. 8 pages 1047–1052, which is incorporated herein by reference. Typical values should range from about 50 to 90% and preferably from about 70 to 85%.

Figure 2:
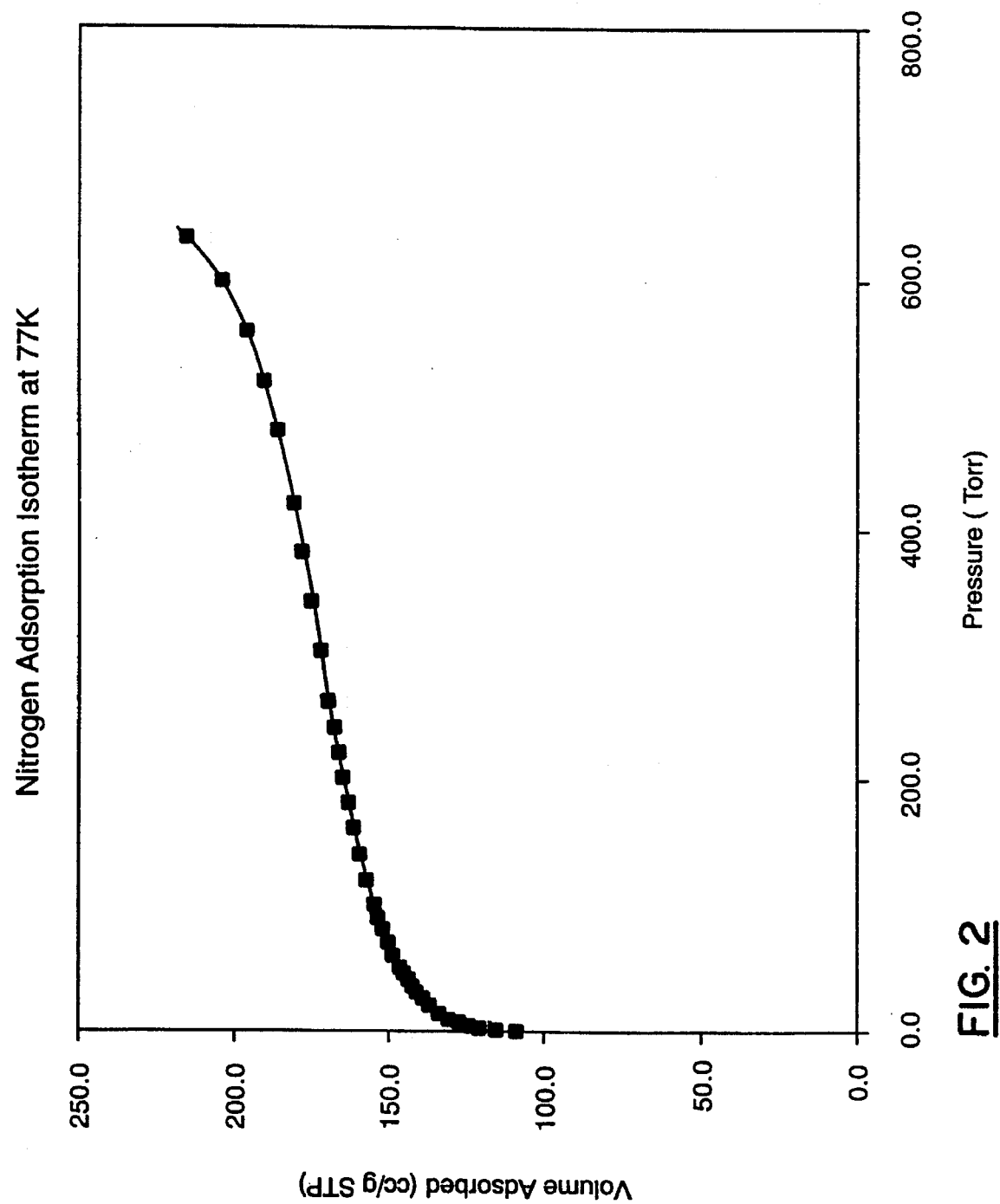
FIG. 2 is a Nitrogen Adsorption Isotherm at $-196°$ C. for the carbon sample of Example 1.

A typical nitrogen adsorption isotherm is shown in FIG. 2. The rapid increase in the adsorbed volume at low pressure indicates the presence of micropores in this material. An additional increase close to atmospheric pressure is due to larger pores, probably related to intercrystalline spaces.

Figure 3A:
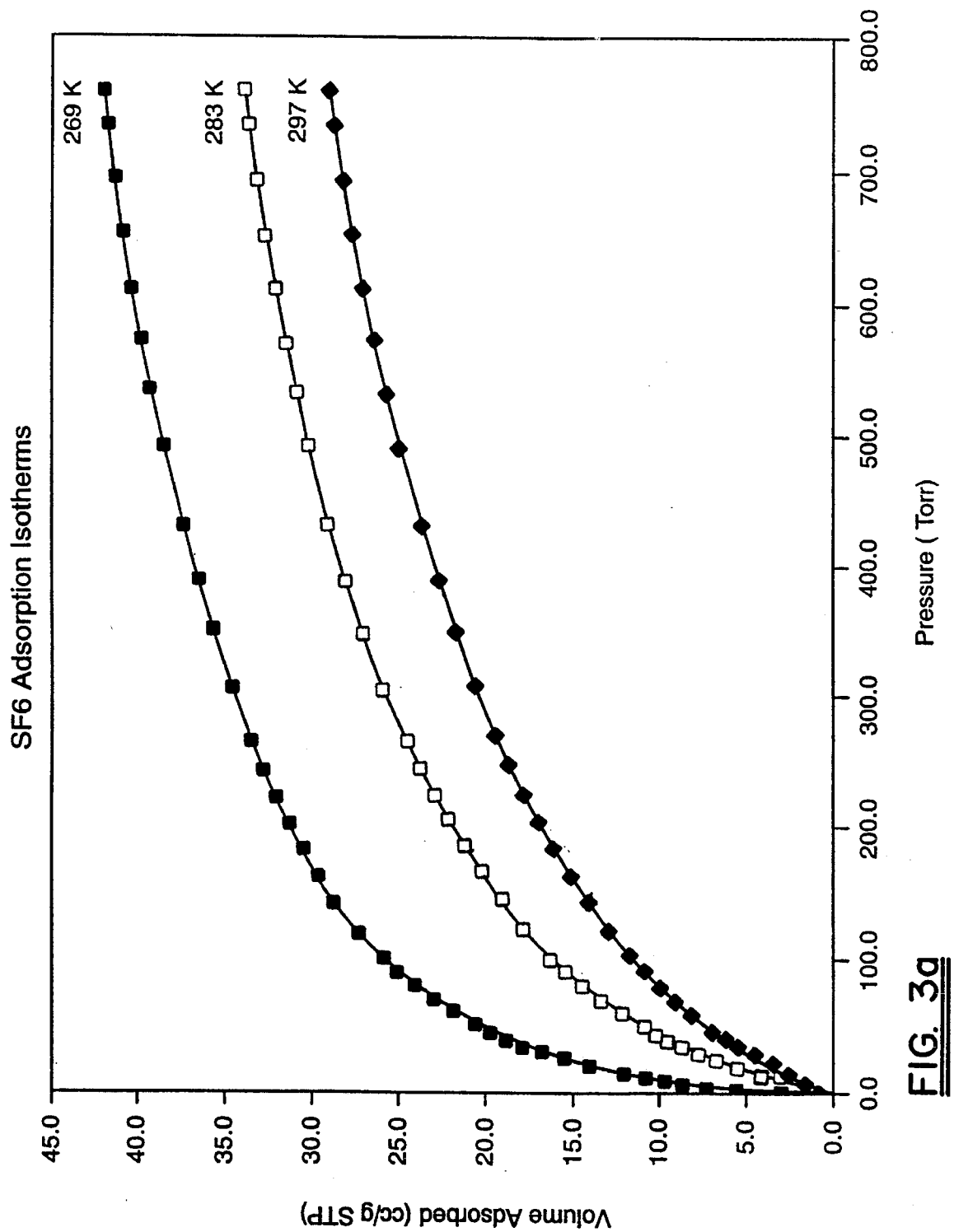
FIG. 3 A, B, and C are Adsorption isotherms for $SF_6$, $CF_4$ and $CH_4$ at three temperatures for the carbon sample of Example 1.
Figure 3C:
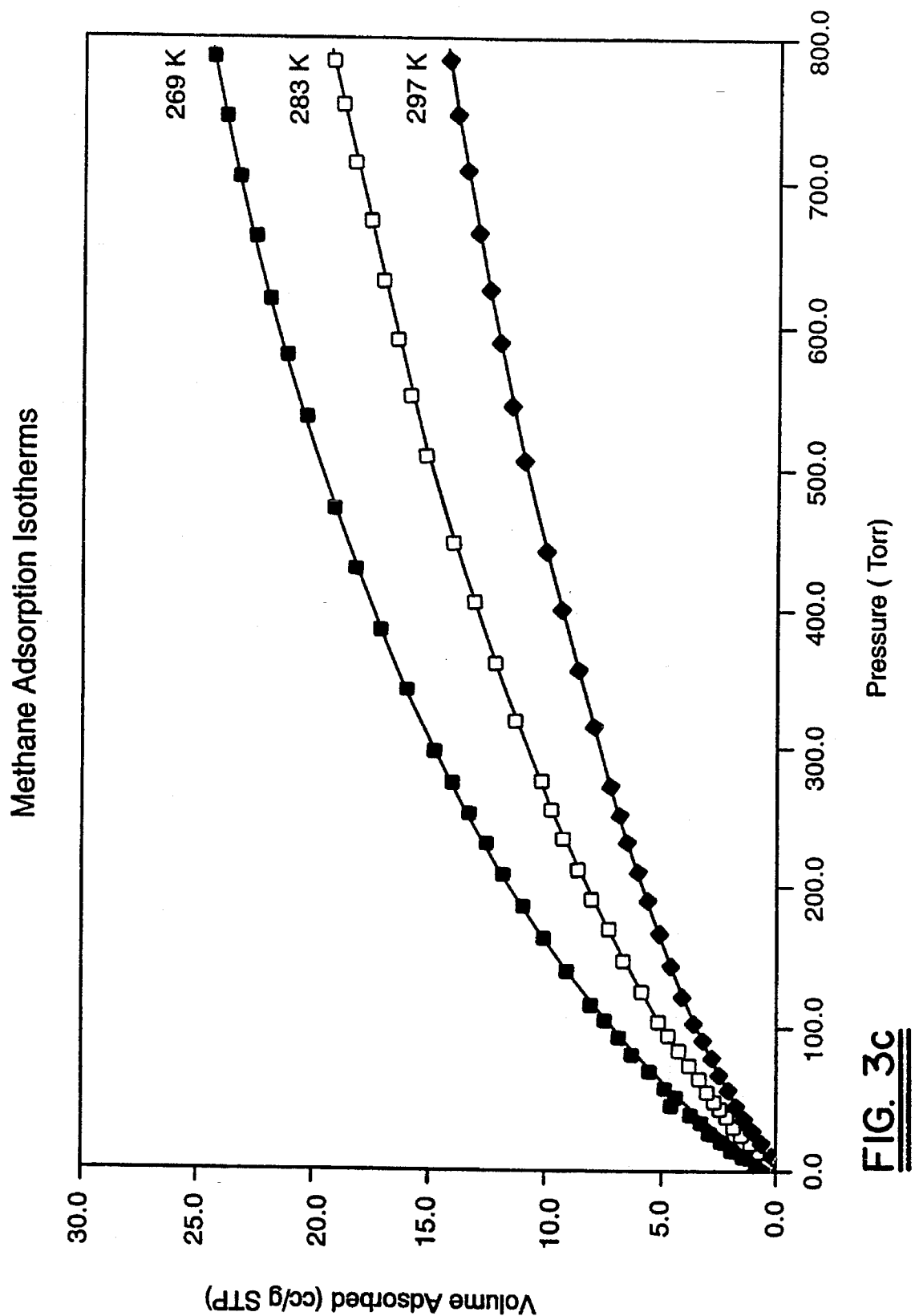
Figure 4:
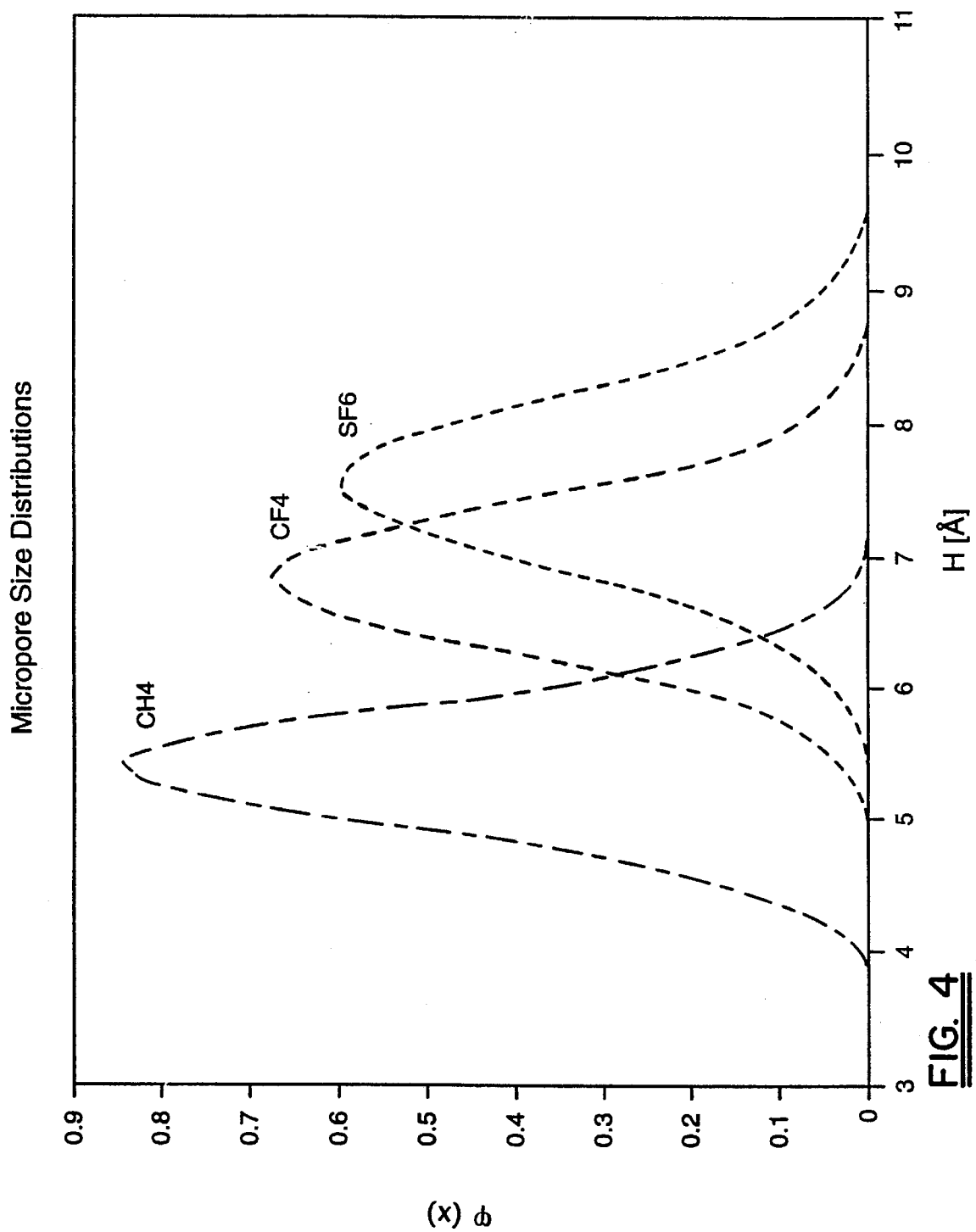
FIG. 4 are pore size distributions for the carbon sample of Example 1, evaluated by $SF_6$, $CF_4$ and $CH_4$.

Sorption of methane, tetrafluorocarbon and sulfur hexafluoride was measured at three different temperatures near ambient using the same apparatus, but equipped with a thermostatic system. FIG. 3 presents adsorption isotherms of $CH_4$ (a), $CF_4$ (b) and $SF_6$ (c). These isotherms were used for evaluation of micropore size distributions according to *Relationship Between Energetic and Structural Heterogeneity of Microporous Carbons Determined on the Basis of Adsorption Potentials In Model Micropores*, by J. Jagiello and J. A. Schwarz; which appears in Langmuir, 1993, 9, 2513–2517.

A Cahn 1000 microbalance is used for storage measurements. Data are reported on a weight/weight basis as well as a volume/volume basis. The latter was calculated based on the mercury density of the adsorbent. A more complete description of the storage determination is set forth in the article *Hydrogen Storage Systems*, by J. A. Schwarz and K. A. G. Amankwah which appears in the U.S. Geological Survey Professional, Paper 1570, which is incorporated herein by reference.

The following examples illustrate various embodiments of the present invention in which carbon samples were prepared at different temperatures in the range of 500° C. to 850° C.

EXAMPLE 1

A carbon sample made according to the present invention is prepared by temperature controlled heat treatment of naphthalene-1,5-disulfonate, disodium salt (NDS), available from Aldrich under Catalog No. 25,089-9. A 10 gm sample of NDS is placed in a sealed quartz tube in an electrically heated oven. The carbonization is carried out in a nitrogen flow (20 ml/min) with a heating rate of 10 deg/min up to 650° C. and then kept at this temperature for 3 hours. After cooling under nitrogen, the material is washed with deionized water to dissolve and remove the sodium salt and soluble intermediates. The porous carbon product is then washed with ethanol.

The carbon particles produced by the above process have an average size of about 10 μm and exhibit a uniform micropore size distribution in the range of about 4 to 15 Å. The particles of the carbon product have the same general shape as the original precursor, that is they are roughly hexagonal plate-like crystallites. However, SEM results show that the majority of the particles are deeply cracked and fractured due to high porosity. Under high resolution TEM the porous carbon product shows microtexture composed from randomly distributed small basic structural units of the size of about 10 Å, corresponding to stackups of 2 or 3 polyaromatic layers. Inside the pore walls the orientation of BSU are almost parallel.

The surface area, total pore volume and micropore volume (DR method) for this sample are determined from $N_2$ adsorption data and the results are given in Table 1A.

$H_2$ and $CH_4$ storage capacity for these materials were determined and the results are given in Table 1B.

TABLE 1A

| $S_{N2}$ [m²/gm] | $V_{total}$ [ml/gm] | $V_{mic}$ [ml/gm] |
|---|---|---|
| 795 | 0.48 | 0.18 |

TABLE 1B

| Gas | gm/gm | v/v | p (atm) | T(°C.) |
|---|---|---|---|---|
| $CH_4$ | 0.093 | 123.73 | 51.42 | 27 |
| $H_2$ | 0.024 | 254.294 | 5.04 | −196 |

EXAMPLE 2

The process of Example 1 is repeated except that the sample is carbonized with a 5 deg/min heating rate up to 650° C. and then kept at this temperature for 3 hours. The resulting carbon was then evaluated as in Example 1. The results are given in Tables 2A and 2B.

TABLE 2A

| $S_{N2}$ [m²/gm] | $V_{total}$ [ml/gm] | $V_{mic}$ [ml/gm] |
|---|---|---|
| 740 | 0.33 | 0.16 |

TABLE 2B

| Gas | gm/gm | v/v | p (atm) | T(°C.) |
|---|---|---|---|---|
| $CH_4$ | 0.081 | 107.52 | 51.17 | 27 |
| $H_2$ | — | — | — | — |

EXAMPLE 3

The process of Example 1 is repeated except that the sample is carbonized with a 10 deg/min heating rate up to 550° C. and then kept at this temperature for 2 hours followed by a 10 deg/min heating rate to 650° C. and held at this temperature for 1 hour. The resulting carbon was then evaluated as in Example 1. The results are given in Tables 3A and 3B.

TABLE 3A

| $S_{N2}$ [m²/gm] | $V_{total}$ [ml/gm] | $V_{mic}$ [ml/gm] |
|---|---|---|
| 650 | 0.25 | 0.1 |

TABLE 3B

| Gas | gm/gm | v/v | p (atm) | T(°C.) |
|---|---|---|---|---|
| $CH_4$ | 0.050 | 66.87 | 30.81 | 27 |
| $H_2$ | — | — | — | — |

EXAMPLE 4

The process of Example 1 is repeated except that the sample is carbonized with a 10 deg/min heating rate up to 850° C. and then kept at this temperature for 3 hours. The resulting carbon was then evaluated as in Example 1. The results are given in Table 4A. No storage data were recorded.

TABLE 4A

| $S_{N2}$ [m²/gm] | $V_{total}$ [ml/gm] | $V_{mic}$ [ml/gm] |
|---|---|---|
| 950 | 0.63 | 0.19 |

EXAMPLE 5

The process of Example 1 is repeated except that the sample is carbonized with a 5 deg/min heating rate up to 650° C. and then kept at this temperature for 1 hour followed by 10 deg/min heating rate up to 850° C. and then kept at this temperature for 2 hours. The resulting carbon was then evaluated as in Example 1. The results are given in Tables 5A and 5B.

TABLE 5A

| $S_{N2}$ [m²/gm] | $V_{total}$ [ml/gm] | $V_{mic}$ [ml/gm] |
|---|---|---|
| 1030 | 0.43 | 0.23 |

TABLE 5B

| Gas | gm/gm | v/v | p (atm) | T(°C.) |
|---|---|---|---|---|
| $CH_4$ | 0.104 | 137.82 | 51.29 | 27 |
| $H_2$ | — | — | — | — |

EXAMPLE 6

The process of Example 1 is repeated except that the precursor used is poly(sodium-4-styrenesulfonate) available frown Aldrich under Catalog No. 24,305–1. The sample is carbonized at 500° C. and then kept at this temperature for 3 hours. The sample was then evaluated as in Example 1. The results are given in Tables 6A and 6B.

TABLE 6A

| $S_{N2}$ [m²/gm] | $V_{total}$ [ml/gm] | $V_{mic}$ [ml/gm] |
| --- | --- | --- |
| 600 | 0.19 | 0.14 |

TABLE 6B

| Gas | gm/gm | v/v | p (atm) | T(°C.) |
| --- | --- | --- | --- | --- |
| $CH_4$ | 0.072 | 66.76 | 50.21 | 27 |
| $H_2$ | — | — | — | — |

EXAMPLE 7

The process of Example 6 was repeated except that carbonization was carried out at 600° C. The results are given in Table 7A. No storage data were recorded.

TABLE 7A

| $S_{N2}$ [m²/gm] | $V_{total}$ [ml/gm] | $V_{mic}$ [ml/gm] |
| --- | --- | --- |
| 645 | 0.21 | 0.15 |

EXAMPLE 8

The process of Example 6 was repeated except that carbonization was carried out at 650° C. The results are given in Table 8A. No storage data were recorded.

TABLE 8A

| $S_{N2}$ [m²/gm] | $V_{total}$ [ml/gm] | $V_{mic}$ [ml/gm] |
| --- | --- | --- |
| 700 | 0.25 | 0.16 |

EXAMPLE 9

The process of Example 6 was repeated except that carbonization was carried out at 850° C. The results are given in Tables 9A and 9B.

TABLE 9A

| $S_{N2}$ [m²/gm] | $V_{total}$ [ml/gm] | $V_{mic}$ [ml/gm] |
| --- | --- | --- |
| 850 | 0.38 | 0.20 |

TABLE 9B

| Gas | gm/gm | v/v | p (atm) | T(°C.) |
| --- | --- | --- | --- | --- |
| $CH_4$ | 0.109 | 120.08 | 53.88 | 27 |
| $H_2$ | 0.036 | 322.61 | 41.54 | −196 |

The results presented above provide the evidence of micropore structure development in carbons obtained by carbonization of carefully selected precursors. The choice of heating rate, carbonization temperature and time at temperature are very important factors in that the carbonization of organic precursors in different temperature regimes is accompanied by chemical transformations within the materials. A suitable heating rate ranges from about 1 to 40 deg/min, and preferably from about 5 to 15 deg/min. The carbonization temperature may range frown about 300° to 1000° C., and preferably from about 350° to 850° C. The time at the carbonization temperature may vary from about 1 to 10 hours, and preferably is in the range of about 1 to 4 hours. For example, the carbonization of poly(sodium-4-styrenesulfonate) results in possible structural rearrangement of the polycondensed units in the carbonaceous material, and the release of gaseous intermediates during heat treatment at higher temperatures, which are probably the factors that determine the properties of the microporous carbons. This indicates that by changing the carbonization temperature of poly(sodium-4-styrenesulfonate), one can obtain microporous carbon with desired pore size distributions. The optimum in materials' properties depends upon its final application. A more thorough understanding of the present invention can be obtained by a reading of the 1995 technical paper in Carbon referenced to above which is incorporated herein by reference.

The only known microporous carbon material available in the art, which is relevant to the present invention, is manufactured and sold under the tradename Maxsorb by Kansai Coke and Chemicals Co. Ltd., Amagasaki City, Japan. This material is believed to be made by a multiple step, complex process. The material is very expensive. Maxsorb has a micropore size distribution of about 7 to 20 Å, with considerable amount of pores in the mesopore range. A further disadvantage of Maxsorb is that it exhibits unfavorable packing between its BSUs which results in a mercury density of about 0.485 gn/cm³.

The materials of the present invention are manufactured directly in a one step carbonization process from carefully selected crystalline precursors. These materials exhibit a narrowly controlled pore size range of about 4–15 Å, and a mercury density of about 0.5 to 1.0 gm/cm³, with a preferable density of about 0.8 to 1.0 gm/cm³, which make them uniquely suitable for light gas storage.

The invention has been described here with reference to a few illustrative examples. However, the invention is not limited to those examples. Rather, many modifications and variations thereof would present themselves to those of skill in the art without departure from the principles of this invention, as defined in the appended claims.

We claim:

1. A microporous carbon adsorbent material which has a mercury density of about 0.5 to 1.0 gm/cm³, and which is the product of the pyrolysis of a nonporous crystalline aromatic sulfonate or nonporous polymeric salt, said material being suitable for use as a storage media for light gases, and having a uniform pore size distribution of micropores in the range of about 4 to 15 Å, and a total specific surface area greater than about 600 m²/gm.

2. The material of claim 1 in which the mercury density of the microporous carbon is at least about 0.5 gm/cm³.

3. The material of claim 1 in which the mercury density of the microporous carbon is in the range of 0.5 to 1.0 gm/cm³.

4. The material of claim 1 in which the micropores comprise about 70 to 85% of said surface area.

5. The material of claim 1 in which the micropores comprise at least about 50% of the total specific surface area of the material.

6. A method of making a microporous carbon material which comprises;

(a) providing a polymeric precursor selected from the group consisting of a crystalline aromatic sulfonate and a nonporous polymeric salt; and (b) carbonizing said precursor in an oxygen free atmosphere at a temperature in the range of about 350° to 1000° C. for a time sufficient to promote thermally induced hydrogen abstraction and rearrangement of basic structural units which result in the formation of a carbonaceous microporous material having a uniform pore size distribution of micropores.

7. The method of claim 6 in which the carbonizing time ranges from about 1 to 4 hours.

8. The method of claim 6 in which the precursor is heated to the carbonizing temperature at the rate of about 5–15 deg C./min.

9. The method of claim 6 in which the pore size distribution of the carbonaceous material is in the range of about 4–15 Å.

10. The method of claim 6 in which the mercury density of the resulting carbon material is from about 0.5 to 1.0 gm/cm$^3$.

11. The method of claim 6 in which the micropores comprise at least 50% of the surface area of said microporous carbon material.

* * * * *